US00RE34172E

United States Patent [19]

Gwinn et al.

[11] E Patent Number: Re. 34,172

[45] Reissued Date of Patent: Feb. 2, 1993

[54] CONTINUOUS MIXER

[75] Inventors: J. S. Gwinn; Michael J. Miller, both of Bartlesville, Okla.

[73] Assignee: Phillips Petroleum Company, Bartlesville, Okla.

[21] Appl. No.: 793,935

[22] Filed: Nov. 15, 1991

Related U.S. Patent Documents

Reissue of:

[64] Patent No.: 4,767,216
Issued: Aug. 30, 1988
Appl. No.: 489,991
Filed: Apr. 29, 1983

[51] Int. Cl.[5] ..... B01F 7/08

[52] U.S. Cl. ..... 366/85; 366/300; 366/318; 366/321; 366/323

[58] Field of Search ..... 366/85, 83, 84, 88, 366/300, 79, 89, 318, 321, 323; 425/204, 208

[56] References Cited

U.S. PATENT DOCUMENTS

| | | | |
|---|---|---|---|
| 2,820,618 | 1/1958 | Bolling | 259/104 |
| 3,154,808 | 11/1964 | Ahlefeld, Jr. et al. | 18/2 |
| 3,239,878 | 3/1966 | Ahlefeld, Jr. et al. | 18/2 |
| 3,565,403 | 2/1971 | Matsuoka | 259/6 |
| 3,704,866 | 12/1972 | Mosher et al. | 259/192 |
| 3,764,118 | 10/1973 | Matsuoka | 259/192 |
| 4,310,251 | 1/1982 | Scharer et al. | 366/77 |
| 4,332,481 | 6/1982 | Inoue et al. | 366/84 |
| 4,380,397 | 4/1983 | Hashizume et al. | 366/77 |

FOREIGN PATENT DOCUMENTS

| | | |
|---|---|---|
| 291527 | 7/1971 | Austria . |
| 2513577 | 10/1975 | Fed. Rep. of Germany . |
| 35959 | 3/1980 | Japan . |
| 136632 | 10/1981 | Japan . |
| 2024635 | 1/1980 | United Kingdom . |

*Primary Examiner*—Frankie L. Stinson
*Attorney, Agent, or Firm*—David L. Kinsinger

[57] ABSTRACT

A continuous mixer with twin parallel rotors, a feed end and a discharge end is disclosed which is characterized by mismatched rotors. The apexes, or points at which the rotor tips change direction, are substantially misaligned as between the individual rotors of the pair.

18 Claims, 7 Drawing Sheets

CONTINUOUS MIXER

Matter enclosed in heavy brackets [ ] appears in the original patent but forms no part of this reissue specification; matter printed in italics indicates the additions made by reissue.

*This is a reissue application of Ser. No. 489,991, filed Apr. 29, 1983, now U.S. Pat. No. 4,767,216 issued on Aug. 30, 1988.*

BACKGROUND OF THE INVENTION

The invention relates to a continuous mixer. In another aspect, the invention relates to a process for melting a particulate material.

The advantages of continuous processes as compared to batch processes in industries characterized by high throughput are well known. One industry in which continuous processes have gained wide acceptance is the polymer industry. This is especially true for the polyolefins and polyvinyl chloride (PVC) industries, largely because of the high throughput of commercial plants.

Generally, polymers are recovered from their formation processes in the form of a fluff of very fine particles which, because of its low bulk density, is unsuitable for shipment to manufacturers. It must be densified to a high apparent bulk density. The process of densifying the polymer usually involves melting it and forming it into pellets. Since the polymer must be melted in order for it to be formed into pellets, the opportunity is presented to compound certain desirable agents into the polymer. Thus, when the polymer is melted it is usually simultaneously compounded with pigments, reinforcing agents, stabilizers, processing aids and the like prior to its being pelleted. It is to this process of melting the polymer and optionally mixing it with a desired ingredient to a point of homogeneity that the present invention is addressed.

One type of mixer which has gained wide acceptance in the industry is denoted as a Farrel Continuous Mixer (FCM) which is sold by the Farrel Corporation of Ansonia, Conn. This machine is characterized by parallel twin rotors enclosed in a suitable housing or barrel with a feed entrance at one end and a melt exit at the other end. The device is manufactured in various sizes which are normally characterized by rotor diameter. For example, an FCM with a 2-inch diameter rotor is commonly denoted a 2FCM and a mixer with a 9-inch diameter rotor is denoted a 9FCM which is a commercial device. The barrel length is generally a multiple of the rotor diameter and is usually about 3.5 times the rotor diameter. The device is compact and capable of high throughput.

The FCM is available with various rotor designs. Naturally, certain designs are recommended by the manufacturer for certain applications. The rotor style recommended primarily for polyolefins is denoted a #15 rotor style. A #7 rotor style is recommended for processing polyvinyl chloride. The #7 rotor is a milder design that the #15 and does not mix as vigorously. When the #7 rotor style is used for polyolefin processing the ribbon temperature and specific energy requirements of the melting and mixing process are lowered but mixer process control is unstable.

It would be desirable to provide a process for melting and mixing plastics, especially polyolefins, in which the maximum temperature to which the polymer is subjected is as low as possible provided that adequate mixing and melting is achieved. It would be further desirable to provide a process and apparatus for melting and mixing polyolefin polymer, especially polyethylene, which is characterized by low specific energy requirements, defined as the energy expended per pound of polymer processed, provided that adequate mixing and melting of the polymer is achieved. It would be still further desirable to provide a mixer and a mixing process characterized by outstanding stability against changes in feed rate.

OBJECTS OF THE INVENTION

It is an object of this invention to provide a mixer and a mixing process characterized by a low product temperature, a uniform rate of temperature increase as the material is processed, and improved stability of product temperature toward fluctuations in the feed rate.

It is a further object of this invention to provide a mixer and a mixing process characterized by a low energy input per pound of material processed, and low sensitivity in energy requirements per pound of polymer processed to fluctuations in rotor speed.

It is a further object of this invention to provide a mixer and a mixing process characterized by an increased throughput of polymer at constant horsepower loading of the mixer.

It is a still further object of this invention to provide a mixer and a mixing process which provides improvements in product quality especially polyethylene product quality such as a lower MI drop during processing, improved Elmendorf tear strength, improved Spencer impact rating, improved environmental stress crack resistance (ESCR), improved hoop stress rating for certain applications, and better color.

These and further objects of the invention will be more apparent from the following detailed description of the invention and the drawings.

SUMMARY OF THE INVENTION

One embodiment of the invention can be practiced by simply changing out one rotor in the rotor pair of a Farrel Continuous Mixer. For example, where the existing rotors are characterized as a 15 short and a 15 long pair (15S/15L) such as would be the case in most of the polyethylene plants which use these mixers, the invention can be practiced by substituting a 7 long rotor for the 15 long rotor to provide a 15 short/7 long (15S/7L) pair. Conversely, where the existing equipment utilizes a 7 long/7 short pair of rotors (7L/7S), the invention can be practiced by substituting a 15 short rotor for the 7 short rotor to provide the desired 7 long/15 short (7L/15S) pair.

Generally, the apparatus in accordance with the invention comprises a housing defining a first generally cylindrical chamber and a second generally cylindrical chamber parallel to the first generally cylindrical chamber and laterally connected with the first generally cylindrical chamber and a discharge orifice at a discharge end of the housing which communicates with each of the first generally cylindrical chamber and the second generally cylindrical chamber. A first rotor, which can be a 7L, having a feed section and a mixing section, with the mixing section having a feed end and a discharge end and comprising a first mixing portion and a second mixing portion is positioned generally axially in the first generally cylindrical chamber with the second mixing portion adjacent the discharge orifice. The feed section of the rotor is formed by a shaft which has a screw flight attached thereto twisting in a first rotational direction. The first mixing portion of the mixing section is formed with a generally elliptical cross section having generally opposed first and second rotor tips twisting in the first rotational direction. The second mixing portion is formed with a generally elliptical cross section and has generally opposed first and second rotor tips twisting in a second rotational direction. The first rotor tip of the first mixing portion is connected to the first rotor tip of the second mixing portion at a first apex which is positioned at a first distance from the discharge orifice. The second rotor tip of the first mixing portion is connected to the second rotor tip of the second mixing portion at a second apex which is generally opposed from the first apex and is positioned at a second distance from the discharge orifice which is usually slightly different from the first distance.

A second rotor having a feed section and a mixing section is positioned in the second generally cylindrical chamber. The feed section is formed by a shaft having a screw flight attached thereto. However the screw flight on the second rotor twists in a second rotational direction opposite to the first rotational direction. The first mixing portion of the second rotor is also formed with a generally elliptical cross section and has generally opposed first and second rotor tips. These first and second rotor tips of the first mixing portion of the second rotor however twist in the second rotational direction. The second mixing portion of the second rotor is formed with a generally elliptical cross section having generally opposed first and second rotor tips twisting in the first rotational direction. The first tip of the first mixing portion connects to the first tip of the second mixing portion at a third apex which is positioned at a third distance from the discharge orifice. The second tip of the first mixing portion is connected to the second tip of the second mixing portion at a fourth apex which is generally opposed from the third apex and is positioned at a fourth distance from the discharge orifice. Generally the third distance and the fourth distance are slightly different. In accordance with the invention, at least one of the third distance and the fourth distance is substantially different from the first distance or the second distance. In this manner, the rotors used in the present invention are mismatched.

In another embodiment, the invention relates to a process for melting particulate materials, such as thermoplastic resin, preferably a fluff, having a flux point of between about 100° C. and about 400° C. The process comprises the steps of introducing the particulate material into at least one screw feeder and forcing it by the action of the at least one screw feeder into a mixing chamber having the following characteristics. The outer bounds of the mixing chamber is defined by the interior of a barrel having first and second parallel interconnecting cylindrical chambers. The at least one screw feeder is positioned at a first end of the mixing chamber. A discharge orifice is positioned adjacent the second end of the mixing chamber. A first rotor is positioned in the first generally cylindrical chamber and it is characterized by a first tip beginning at the first end of the mixing chamber and following a helical path spiraling in a first rotational direction at a pitch greater than about half of a mixing chamber length. The first rotor has also a second tip beginning at the end of the first tip which is next to the discharge orifice and following a helical path spiraling in a second rotational direction at a pitch greater than about half of a mixing chamber length. The first tip meets with the second tip at an apex which is positioned at a distance from the first end of the mixing chamber between about 30 percent and 70 percent of the distance to the second end of the mixing chamber. A second rotor is positioned in the second cylindrical chamber and it is characterized by a first tip beginning at the first end of the mixing chamber and following a helical path spiraling in the second rotational direction at a pitch greater than about half of a mixing chamber length. A second tip begins at the end of the first tip which is next to the discharge orifice and follows a helical path which spirals in the first rotational direction at a pitch greater than about half of a mixing chamber length. The first tip meets with the second tip at an apex which is positioned at a distance from the first end of the mixing chamber of between about 30 percent and about 70 percent of the distance to the second end of the mixing chamber. The difference in the positioning of the apex of the first rotor and the apex of the second rotor is at least about 20 percent of the distance between the first end of the mixing chamber and the second end of the mixing chamber. The first rotor and the second rotor are counterrotated in accordance with the invention with sufficient speed to work and melt the particulate material which has been introduced into the chamber by the screw feeder. The first rotor and the second rotor are rotated in the direction away from the first rotor apex and the second rotor apex so that the first rotor second tip and the second rotor second tip are rotating in the direction of the discharge orifice as they sweep past each other.

The apparatus and process previously described provide melted uniform ribbon from the particulate feed which has an unexpectedly low temperature and requires an unexpectedly low energy input to produce. The apparatus and process is also extremely stable to variations in feed rate in the sense that temperature fluctuations in the melted ribbon are very small compared to the variations in the feed rate. Since the temperature of the melted ribbon to a large extend influences the properties of product formed with the material being processed, small temperature fluctuations are extremely desirable, since it makes it much easier to provide on-specification polymer for customers.

DETAILED DESCRIPTION OF THE INVENTION

Figure 1:
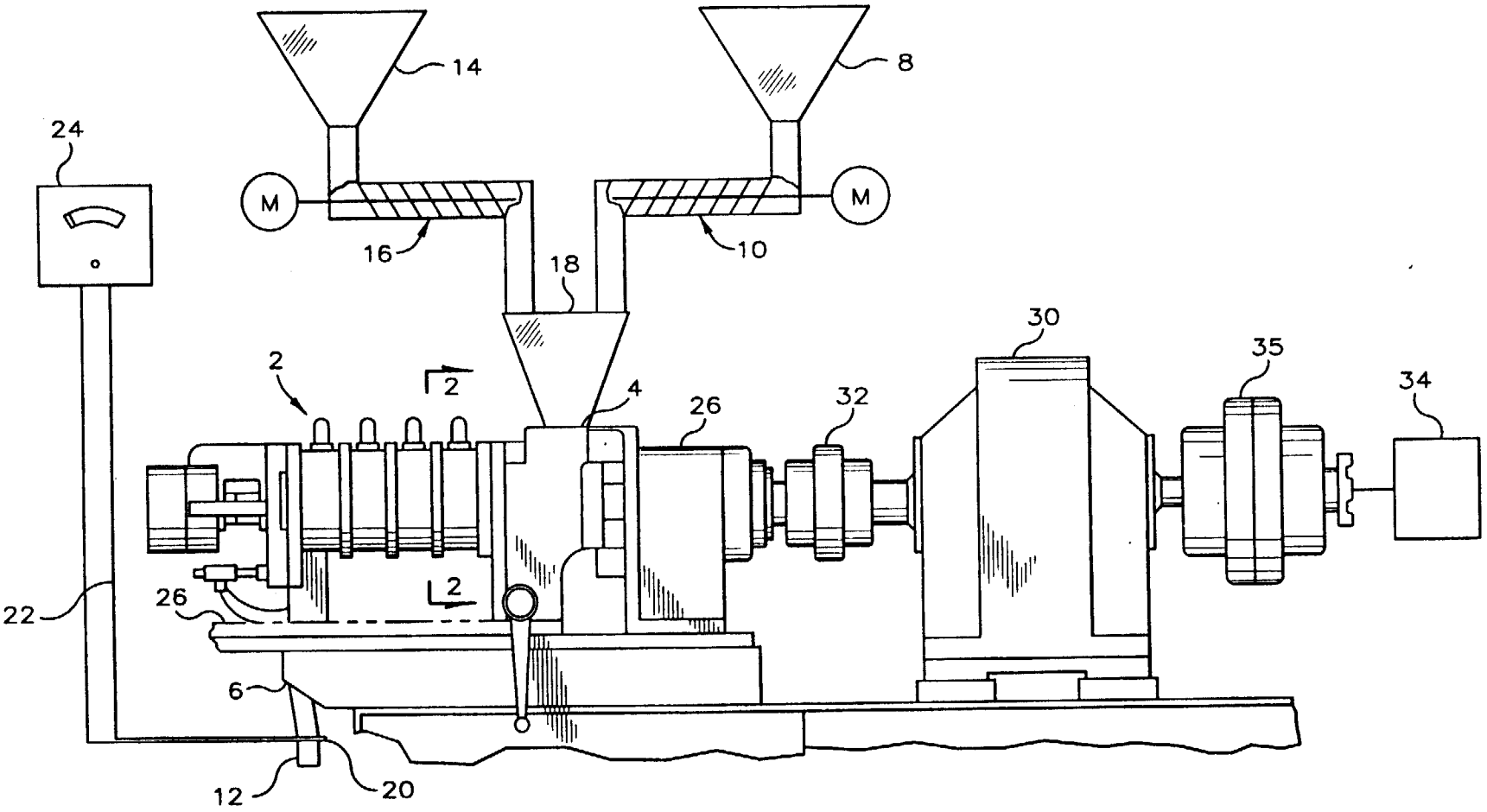
FIG. 1 is a side view of an apparatus shown partly in schematic which embodies certain features of one embodiment of the present invention.

The apparatus shown in FIG. 1 comprises a housing 2 having an inlet 4 for the admission of a particulate feed material and an outlet 6 for the emission of a melted product. Usually, the inlet 4 will be positioned to receive material metered from a feed hopper 8 into the inlet 4 via a suitable metering means such as a screw feeder 10. The hopper 8 contains the particulate material which is to be worked upon in the housing 2. Generally in accordance with the invention, the particulate material will comprise a thermoplastic resin having a flux point of between about 100° and about 400° C. It is melted in the housing 2 and emitted therefrom at 6 in the form of a ribbon 12 which is passed to an extruder-pelleter or the like for further processing.

Where the material in the hopper 8 is to be blended with a blending agent such as a reinforcing or coloring agent or the like to make it more desirable for its intended end use, it is expeditious to introduce the blending agent into the housing 2 together with the particulate thermoplastic resin. To this end, a hopper 14 is positioned to pass a blending agent such as carbon black or mica or the like into the inlet 4 at a rate appropriately metered by a metering means 16 which can be a screw feeder or the like. In the embodiment of the invention shown in FIG. 1, both metering means 10 and 16 meter into a hopper 18 which is positioned to pass material to the inlet 4 of the housing.

The temperature of the ribbon 12 emitted from housing 2 at port 6 is monitored by a thermocouple 20 which is connected by suitable electrical conduits 22 to a temperature gauge 24. The housing 2 is conveniently mounted on a track 26 so as to be easily removable apart from the rotors hereinafter described for cleaning. The housing 2 is connected to a gear box 28. The gear box 28 is connected to a clutch 30 by a suitable coupling 32. The clutch 30 is connected to a motor means 34 by a suitable motor coupling 35.

The apparatus thus far described can be conventional. It may be further outfitted with other optional features such as hoses 37 for steam tracing of the housing 2 which is desirable during startup, or for the introduction of cooling fluid which may be desirable in certain instances. Additional inlets, not shown, can be provided through the housing 2 for the introduction of certain processing aids such as glycols or the like.

Figure 2:
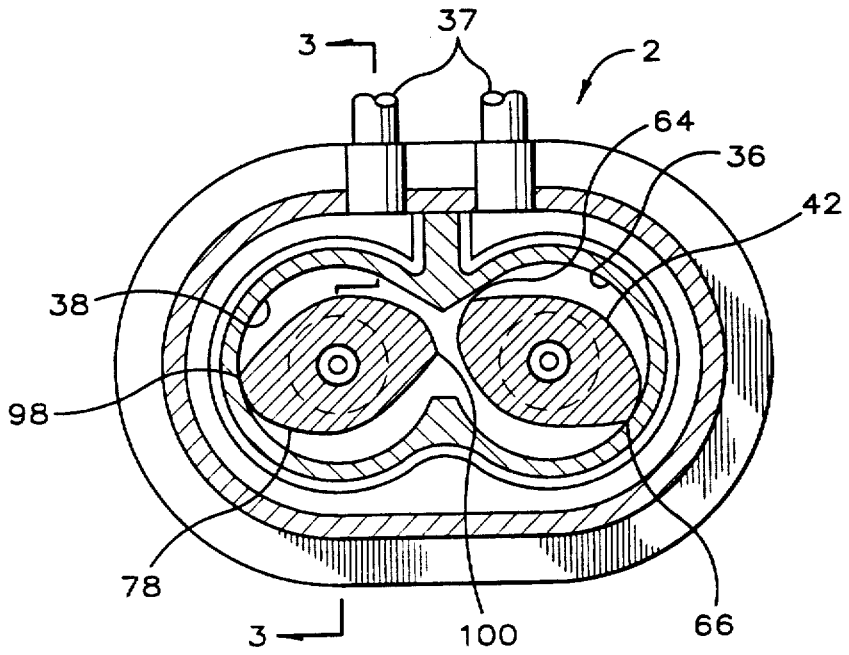
FIG. 2 is a cross-sectional view of the housing portion of the device shown in FIG. 1 when viewed along the indicated lines.
Figure 3:
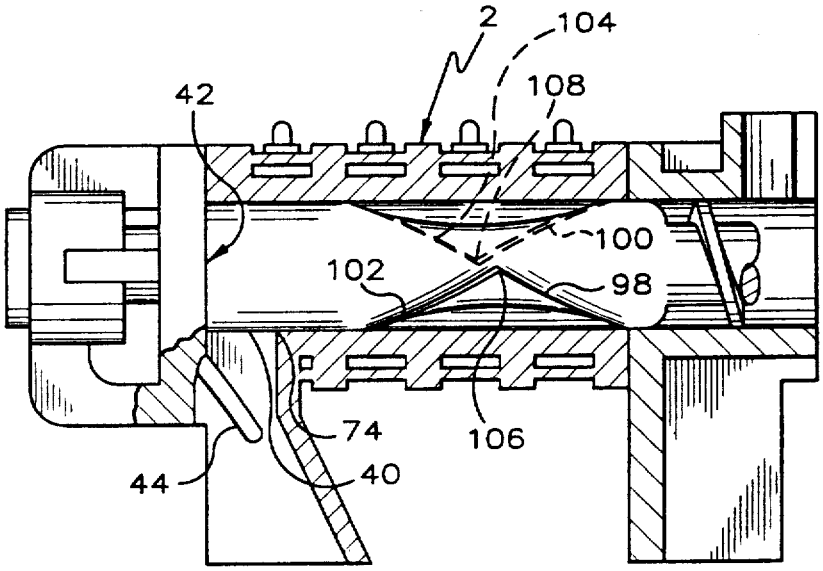
FIG. 3 is a partial cross-sectional view along the lines indicated in FIG. 2 of the apparatus shown in FIG. 1.

With reference now to FIG. 2, the housing 2 defines a first generally cylindrical chamber 36 and a second generally cylindrical chamber 38 which is parallel to the first generally cylindrical chamber 36 and laterally connected with the first generally cylindrical chamber 36. A discharge orifice 40, shown best by FIG. 3, forms the outlet 6 and it positioned adjacent the downstream end 42 of the pair of mixing chambers defined by the housing 2 and communicates with each of the first generally cylindrical chamber 36 and the second generally cylindrical chamber 38. Preferably, a gate 44 is positioned in closable relationship with the discharge orifice 40. The degree of opening of the discharge orifice 40 can be controlled as desired by manipulating the gate 44 by means not shown.

Figure 5:
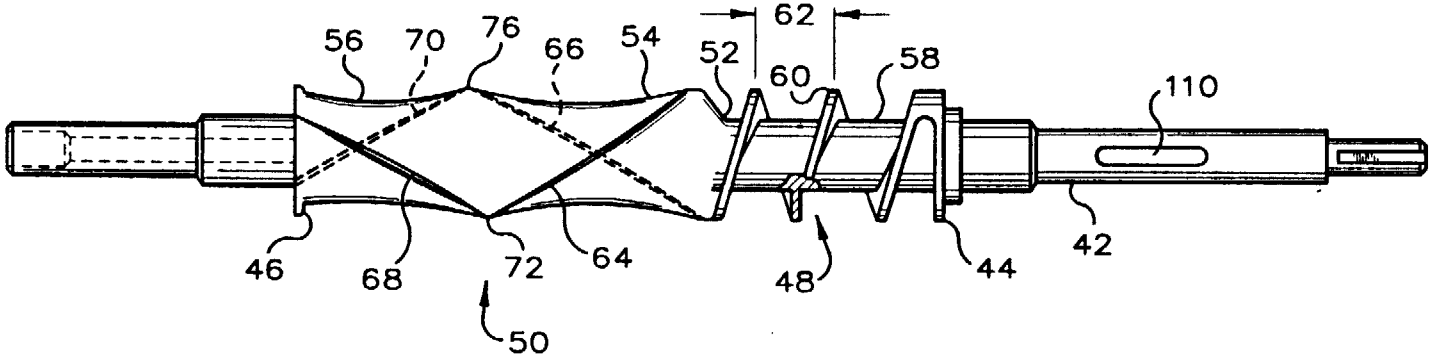
FIG. 5 is a pictorial representation of another rotor usefully employed in the practice of one embodiment of the present invention.

Referring to FIGS. 2 and 5, a first rotor 42 which can be a 7L, is positioned in the first generally cylindrical chamber 36 generally coaxially therewith. The portion of the first rotor 42 which is positioned in the first generally cylindrical chamber 36 has an upstream end 44, a downstream end 46, a feed section 48 which is positioned adjacent the upstream end 44 and a mixing section 50 which is positioned adjacent the downstream end 46. The mixing section 50 begins at a feed end 52 which is positioned adjacent the downstream end of the feed section 48. The mixing section 50 comprises a first mixing portion 54 beginning at the feed end 52 and a second mixing portion 56 positioned between the mixing portion 54 and the downstream end 46. The mixing portion 56 is adjacent to the discharge orifice 40. The feed section 48 is formed by a shaft 58 having a screw flight 60 attached thereto twisting in a first direction at a first twist length indicated by the reference numeral 62. As used herein, the term "twist length" refers to the axial distance traveled along the shaft 58 by a complete helical twist of 360° of the flight or rotor tip, bearing in mind that the mixing portions of the rotor need not be so long that the helix goes through a complete spiral.

The first mixing portion 54 is formed with a generally elliptical cross section, illustrated in FIG. 2 for example. The first mixing portion 54 is provided with a first rotor tip 64 which is generally opposed from a second rotor tip 66. These and the subsequently described rotor tips can be flattened if desired to provide better wear characteristics. The rotor tip 64 twists in the first direction at a second twist length which is greater than the first twist length 62. The rotor tip 66 twists in the first direction at a third twist length which is greater than the first twist length. The second mixing portion is also formed with a general elliptical cross section and has a first rotor tip 68 which is generally opposed from a second rotor tip 70. The first rotor tip 68 of the second mixing portion 56 twists in a second direction at a twist length which is preferably about the same as the second twist length. The second rotor tip 70 twists in the second direction at a twist length which is preferably about the same as the third twist length. The first rotor tip 64 of the first mixing portion 54 is connected to the first rotor tip 68 of the second mixing portion 56 at a first apex 72 which is positioned at a first distance from an upstream edge 74 of the discharge orifice 40. The second rotor tip 66 of the first mixing portion 54 is connected to the second rotor tip 70 of the second mixing portion 56 at a second apex 76 which is generally opposed from the first apex 72 and is positioned at a second distance from the upstream edge 74 of the discharge orifice 40. The twist lengths of the first tips are preferably about the same to avoid imparting axial forces to the material in the mixing section. Likewise, the twist length of the second tips are preferably about the same to avoid substantial axial forces.

Figure 4:
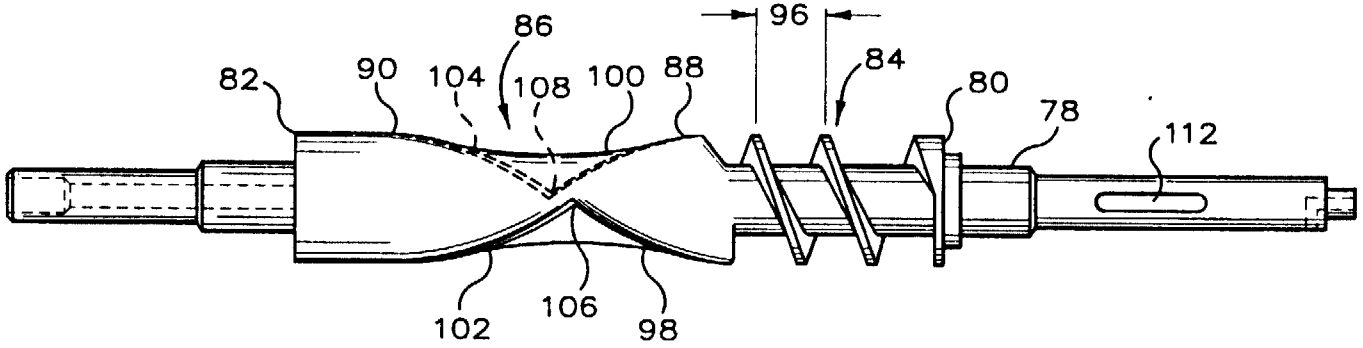
FIG. 4 is a pictorial representation of one of the rotors usefully employed in an embodiment of the present invention.

A second rotor 78 is positioned generally axially in the second generally cylindrical chamber 38. That portion of the second rotor 78 which is positioned in the second generally cylindrical chamber 38 has a first end 80 at the upstream end of the second generally cylindrical chamber 38 and a second end 82 at the downstream end of the generally cylindrical chamber 38. A feed section 84 begins at the upstream end 80. A mixing section 86 extends from the second end 82 to the feed section 84. The mixing section 86 comprises a first mixing portion 88 and a second mixing portion 90. The first mixing portion 88 is positioned adjacent the feed section 84. The second mixing portion 90 is positioned adjacent the discharge orifice 40. The feed section 84 is formed by a shaft 92 having a screw flight 94 attached thereto twisting in a second direction at a fourth twist length illustrated by the reference numeral 96. The fourth twist length can be the same as or different from the first twist length 62. Preferably the twist length 96 is about the same as the twist length 62 so that feed enters the mixing zones defined around the two rotors at about the same rate. The first mixing portion 88 is formed with a generally elliptical cross section as shown best in FIG. 2 and has a first rotor tip 98 which is generally opposed from a second rotor tip 100. The first rotor tip 98 follows a generally helical or spiraling path and twists in the second direction at a fifth twist length which is greater than the fourth twist length 96. The second rotor tip 100 twists in the second direction at a sixth twist length greater than the fourth twist length. The second mixing portion 90 of the second rotor 78 is likewise formed with a generally elliptical cross section having a first rotor tip 102 which is generally opposed from a second rotor tip 104, the first and second rotor tips twisting in the first direction. The first rotor tip 102 has a twist length which is preferably about the same as the fifth twist length. The second rotor tip 104 has a twist length which is preferably about the same as the sixth twist length. The first rotor tip 98 of the first mixing portion 88 connects to the first rotor tip 102 of the second mixing portion 90 at a third apex 106 positioned at a third distance from the upstream edge 74 of the discharge orifice 40. The second rotor tip 100 of the first mixing portion 88 connects to the second rotor tip 104 of the second mixing portion 90 at a fourth apex 108. The fourth apex 108 is generally opposed from the third apex 106 and is positioned at a fourth distance from the upstream edge 74 of the discharge orifice 40. At least one of the rotors 42 or 78 adjacent the discharge orifice can be provided with longitudinally extending rotor tips if desired. This feature is illustrated in FIG. 4.

It is important in the present invention that at least one of the third distance and the fourth distance be substantially different from the first distance or the second distance. It is also preferred that each of the first, second, third and fourth distances be different from each other. Preferably, at least 0.2 mixing section lengths will separate the apex positioned nearest the upstream end of the housing from the apex position nearest the downstream end of the housing, the mixing section being defined by that portion of the rotor with the generally elliptical cross-section. In FIGS. 4 and 5, the apex positioned nearest the upstream end of the housing is third apex 106 and the apex positioned nearest the downstream end of the housing is second apex 76. Generally, the second apex 76 and the third apex 106 will be separated by a distance in the range of from about 0.2 to about 0.8 mixing section lengths, preferably in the range of 0.25 to about 0.5 mixing section lengths. In the most preferred embodiment, since it has been tried and provided good results, a 7L rotor was paired with a 15S rotor. The third and fourth apexes were separated by about 0.25 mixing section lengths.

Referring back to FIG. 1, the gear box 28 contains a means for driving the first rotor 42 and a second rotor 78 in contrarotation so that they move toward the discharge orifice as they sweep by each other. The screw flights 60 and 94 twist in opposite directions with the directions being selected so that they will advance material toward the mixing sections of the two rotors and the discharge orifice as the rotors are drive in contrarotation by the drive means. Generally, the means for driving the rotors in contrarotation comprise intermeshing ring gears (not shown) mounted on the rotors 42 and 78 by keys positioned in keyways 110 and 112. Rotor 42 is coupled directly to coupler 32. Rotor 78 is driven in contrarotation to rotor 42 by the gearing arrangement.

It is very desirable to drive the first rotor 42 and the second rotor 78 at different rates of rotation. This is easily accomplished by using gears mounted to the rotors 42 and 78 which contain different numbers of teeth. Generally speaking, the fast rotor is driven at a rate of rotation in the range of from about 1.05 to about 1.3 times the rate of rotation of the slow rotor. An arrangement which has been used with good results comprises driving the first rotor 42 at a faster rate of rotation than the second rotor 78. This provides better mixing by the device. A differential rotational speed between the rotors of about 1.1 to 1 has been used with good results and is apparently relatively independent of the sizes of the rotors.

Besides the positioning of the apexes, other important characteristics of the mixing sections 50 and 86 include the elliptical cross-sectional dimensions of the first mixing portion 54 and 88 and the second mixing portions 56 and 90 of the first rotor 42 and the second rotor 78. These dimensions are best described in terms of the nominal diameter of the first generally cylindrical chamber 36 and the second generally cylindrical chamber 38. The major axis of the generally elliptical cross sections of the rotors as shown in FIG. 2 is generally between 85 and about 99 percent of the diameter of the generally cylindrical chambers, preferably, 90–95 percent of the diameter. The minor axis is generally between about 45 and about 75 percent of the diameter of the generally cylindrical chambers, preferably 55 to 65 percent. The major axis is measured between the generally opposed rotor tips. The minor axis passes through the longitudinal axis of each rotor in a direction normal to the major axis. Excessive clearance between the rotor tips and the generally cylindrical surface 36 has an adverse effect on mixing conducted in the apparatus and is desirably maintained at low levels, on the order of a few percent of the diameter. In an apparatus which has been used with good results, the major axis of the rotor cross section measures about 93 percent of the diameter of the generally cylindrical chamber; the minor axis of the rotor cross section measures about 59 percent of the generally cylindrical chamber, and the clearance between the rotor tips and the generally cylindrical surface is preferably about 7 percent or less of the diameter of the generally cylindrical chamber.

Another important exterior characteristic of the rotors 42 and 78 is the twist length of the helical paths followed by the rotor tips 64, 66, 68 and 70 and 98, 100, 102 and 104. In the apparatus which has been tested with good results, not all of the twist lengths were the same. The first rotor first and second tips followed about one twist length. One of the second rotor tips followed a twist length less than the first rotor tips, the other second rotor tip followed a twist length greater than the first rotor tips. With reference to FIGS. 4 and 5, the second twist length followed by the first rotor tips 64 and 68 of the first rotor 42 is generally in the range of from about 0.7 to about 2 times the length of the mixing section. The third twist length followed by the second rotor tips 66 and 70 of the first rotor 42 is also within the range of from about 0.7 to about 2 times the length of the mixing section 50. Preferably, the third twist length is in the range of about 1.2 to about 1.6 mixing section lengths, most preferably about 1.4 mixing section lengths, which is about the twist lengths in a 7L rotor. The first twist length which describes the helical path followed by first rotor tips 98 and 102 of the second rotor 78 is also generally in the range of 0.7 to 2 times the length of the mixing section. Usually the fifth twist lengths will be between 1.1 and 1.7 mixing section lengths. For a 2 FCM, 15S rotor, first rotor tips 98 and 102 had a twist length of about 1.5 mixing section lengths. The sixth twist length of second tips 100 and 104 can be in the same ranges as the fifth twist length, and can be different from the fifth twist length. In the 2 FCM 15S rotor, tips 100 and 104 had a twist length of about 1.3 mixing section lengths. It is preferred that one of the rotors be provided with stators adjacent the discharge orifice. In the apparatus which has been used with good results, the rotor tips 102 and 104 of the rotor 78 become axially oriented toward the downstream end 82 of the rotor 92 and exert a greater degree of radial outward force on the material being mixed to better propel it through the discharge orifice 40.

Apex positioning is a very important feature of the present invention. The positioning of the apexes can be described in terms of their positioning with respect to each other as well in terms of their positioning from some common point such as the downstream ends 46 and 82 of the rotors 42 and 78 or the upstream edge 74 of the discharge orifice 40. As previously mentioned, the rotor apex positioned nearest feed end 44 or 80 should be at least 0.2 mixing section lengths away from the rotor apex positioned nearest the downstream end 46 or 82. Besides being spread out in this manner, it is important that the apexes be carefully positioned in the mixing section. Thus, the first apex 72 is positioned preferably at a distance in the range of from about 0.3 to about 0.7 mixing section lengths from the discharge end 46 of the mixing section 50. The second apex is preferably positioned at a distance in the range of about 0.2 to about 0.6 mixing section lengths from the discharge end of the mixing section. The third apex 106 is preferably positioned at a distance in the range of from about 0.45 to about 0.8 mixing section lengths from the discharge end 82 of the mixing section 86 of the rotor 78. The fourth apex is preferably positioned at a distance in the range of from about 0.4 to about 0.8 mixing section lengths from the discharge end 82 of the mixing section 86. Preferably, the apexes are generally situated about the middle of the rotors 42 and 78. More preferably, the second apex can be positioned in the range of from about 0.3 to 0.5 mixing section lengths from the discharge end 46 of the first rotor 42 and is the closest apex to the discharge orifice 40 and the third apex 106 is positioned in the range of from about 0.5 to about 0.8 mixing section lengths from the discharge end 82 of the mixing section and is the furthest apex from the discharge orifice 40.

In another embodiment of the present invention, there is provided a process for melting a particulate material by introducing it into at least one screw feeder as exemplified by screw flights 60 and 94 and forcing the particulate material by the action of the at least one screw feeder into a mixing chamber as exemplified by the housing 2 and its contents. Most any thermoplastic resin can be processed in the apparatus of the invention. Preferably thermoplastic resins to be processed have flux points in the range of about 100° to about 400° C. Although the exact form of the particulate is not important, for example, it can be fluff or pellet, it is preferred to introduce polymer fluff into the apparatus of the invention and recover a molten ribbon for further processing such as in a hot melt extruder where it is forced through a die and pelleted.

As was customary in the prior art, certain additives can likewise be introduced into the mixer of the invention for mixing with the particulate material to be melted. A wide variety of additives are suitable and can be relatively easily introduced from the hopper 14 of FIG. 1 for example. One such additive comprises carbon black and it is used usually in an amount of from about 0.5 to about 25 pounds of carbon black for each 100 pounds of the thermoplastic resin. Polyalpha olefin resins are the preferred resins for processing with the present invention because they have been processed with good results. The most preferred resin and the resin about which the most is known is polyethylene. Where polyethylene and carbon black are mixed in the housing 2, it can also be desirable to further add a processing aid such as glycerine into the housing 2.

In operation of the apparatus, motor 34 is actuated and the rotors 42 and 78 rotate in opposite directions. Metering means 10 is actuated and particulate material is dropped through inlet ports onto the screw flights 60 and 94. The screw flights urge the particulate material into the mixing section 50 and 86 where mixing occurs due to the material interchanging between the apexes. Melting occurs due to the high shear forces between the rotors and between the rotors and the housing. Preferably, 0.15–0.20 Kilowatt hours of energy or less of energy are supplied to the motor means for each kilogram of material forced from the discharge orifice. Although in operation material is withdrawn as ribbon at the same rate it is introduced into the screw feeders it is somewhat inaccurate to say that the ribbon is forced from the exhaust orifice 40 due to the action of additional incoming material along the screw flights 60 and 84. If metering means 10 is turned off, ribbon 12 will continue to flow from the outlet 40 for several seconds. However, the forces in the housing 2 urging the melting material toward the discharge orifice do not appear to be great. In any event, with the rotational speed of the rotors selected, increasing amounts of particulate to be melted are fed into the housing 2 by the metering means 10 until the ribbon 12 fails to exhibit the desired degree of homogeneity, or the maximum permissible motor load is reached. If ribbon non-homogeneity is limiting, the gate 44 is partially closed an arbitrary amount, say 10 percent or so, to increase the pressure in the housing 2, until the ribbon 12 again exhibits the desired degree of homogeneity. The metering means 10 is again speeded up until homogeneity is lost and the gate is readjusted, the process being repeated as required until the maximum permissible motor load is reached.

The invention is illustrated by the following examples. In the following examples the resins processed are sold by Phillips Chemical Company, Bartlesville, Okla., and are identified as follows:

Resin A—Marlex TR-130, a medium density high molecular weight ethylene-hexene copolymer having a density of 0.939 gms/cc; MI=0.30 suitable for extrusion as film.

Resin B—Marlex HMX 50100, an extra high molecular weight ethylene-hexene copolymer having a density of 0.950 gms/cc; HLMI=10 suitable for extrusion as a sheet molting material or for blow molding applications.

Resin C—Marlex HHM 5202, a high density high molecular weight ethylene-hexene-1 copolymer having a density of 0.951 gms/cc; MI=0.35 suitable for blow molding applications.

The tests performed on the resins are detailed as follows:

Melt Index at 190° C. (MI)=ASTM-1238.

High Load Melt Index at 190° C. (HLMI)=ASTM-1238.

Environmental Stress Crack Resistance, 50° C., (ESCR-)=ATSM-1693A.

Environmental Stress Crack Resistance, 100° C., (ESCR)=ASTM-1693C.

Elmendorf Tear=ASTM-1922.

Spencer Impact=ASTM-3420.

Dart Drop=ASTM 1709-75.

Color No.=Phillips Method.

EXAMPLE 1

This example shows that at maximum throughput, the mixer with the 7L/15S pair is more efficient than the mixers with the other tested pairs. Runs were made with Resin B having an HLMI of 14.7 using four different rotor pairs on a 2" FCM mixer with a 1.06/1 gear ratio. The following table shows an energy saving in Hp.Hr/Lb using the 7L/15S pair of rotors.

TABLE 1

| Run No | 2" FCM Rotor Style | Run[3] Time Secs | Rate Lb/Hr (Kg/Hr) | Rotor Speed RPM | Motor Load Hp (KW) | Temp.[1] F.° (C.°) | Open[2] Inches (Cm) | Open % | Hp · Hr/Lb (KWH/Kg) |
|---|---|---|---|---|---|---|---|---|---|
| 1 | 15L/15S | 8.0 | 132 (60) | 800 | 19.6 (14.6) | 445 (229) | 1.125 (2.86) | 100 | 0.149 (0.245) |
| 2 | 15L/7S | 7.0 | 130 (59) | 800 | 19.0 (14.2) | 445 (229) | — | 100 | 0.137 (0.225) |
| 3 | 7L/7S | 7.0 | 145 (66) | 800 | 19.0 (14.2) | 415 (212) | 0.82 (2.08) | 72 | 0.131 (0.215) |
| 4 | 7L/15S | 5.5 | 161 (73) | 800 | 19.0 (14.2) | 377 (191) | 0.83 (2.10) | 74 | 0.118 (0.194) |

[1]Temperature of product ribbon

[2]Discharge orifice opening

[3]Residence time was determined by dropping a crayon into the food and noting color appearance on product ribbon

EXAMPLE 2

The runs in Table 2 using Resins A with MIs of 0.48 and 0.46 show a comparison of melt index properties of ribbon, pellet, and film when using 15L/15S rotor pair (Runs 1–4) and when using 7L/15S rotor pair (Runs 5–8). The gear ratio in all runs was 1.06:1. The data show that the melt index percent drop is less when the polymer is processed with the 7L/15S rotor pair than with the 15L/15S pair.

TABLE 2

| | 2" FCM | | | | | | Hot Melt Extruder[2] | | | Melt Index at 190° C. | | |
|---|---|---|---|---|---|---|---|---|---|---|---|---|
| Run[1] No | Prod Rate Lb/Hr (Kg/Hr) | Rotor Speed RPM | Ribbon Temp F.° (C.°) | Orifice Open % | Hp · Hr Lb (KWH/Kg) | % Max Rate | Screw Speed RPM | Gate Press From Psi (Kg/Cm²) | Melt Temp F.° (C.°) | Fluff MI | Prod MI | MI Drop % |
| 1 AR | | | | | | — | — | — | — | 0.48 | 0.24 | 50 |
| A | 210 | 1150 | 483 | 100 | 0.123 | 100 | 80 | 2220 | 513 | " | 0.25 | 48 |
| AF | (95) | | (250) | | (0.202) | | | (156) | (267) | " | 0.31 | 35 |
| 2 AR | | | | | | — | — | — | — | " | 0.17 | 65 |
| A | 158 | 1150 | 502 | 100 | 0.139 | 75 | 62 | 2000 | 505 | " | 0.20 | 58 |
| AF | (72) | | (261) | | | | | (141) | (263) | " | 0.26 | 46 |
| 3 AR | | | | | | — | — | — | — | | 0.12 | 75 |
| A | 120 | 1150 | 542 | 100 | 0.154 | 57 | 48 | 1800 | 498 | " | 0.17 | 65 |
| AF | (54) | | 283 | | (0.253) | | | (126) | (259) | " | 0.23 | 52 |
| 4 AR | | | | | | — | — | — | — | | 0.36 | 25 |
| A | 121 | 600 | 409 | 100 | 0.121 | — | 45 | 2060 | 453 | " | 0.36 | 25 |
| AF | (55) | | (176) | | (0.199) | | | (149) | (233) | " | 0.36 | 25 |
| 5 AR | | | | | | — | — | — | — | 0.46 | 0.37 | 20 |
| A | 285 | 1150 | 380 | 100 | 0.096 | 100 | 102 | 2600 | 482 | " | 0.36 | 22 |
| AF | (129) | | (193) | | (0.158) | | | (183) | (250) | " | 0.36 | 22 |
| 6 AR | | | | | | — | — | — | — | " | 0.37 | 20 |
| A | 218 | 1150 | 417 | 100 | 0.107 | 77 | 81 | 2400 | 489 | " | 0.35 | 24 |
| AF | (99) | | (214) | | (0.176) | | | (169) | (254) | " | 0.33 | 28 |
| 7 AR | | | | | | — | — | — | — | " | 0.36 | 22 |
| A | 164 | 1150 | 442 | 100 | 0.113 | 58 | 61 | 2150 | 482 | " | 0.34 | 26 |
| AF | (74) | | (228) | | (0.186) | | | (151) | (250) | " | 0.31 | 33 |
| 8 AR | | | | | | — | — | — | — | " | 0.36 | 22 |
| A | 161 | 700 | 382 | 65 | 0.107 | — | 60 | 2340 | 457 | " | 0.36 | 22 |
| AF | (73) | | (194) | | (0.176) | | | (165) | (236) | " | 0.36 | 22 |

[1]AR = ribbon; A = pellets; AF = film. Properties of these materials when formed from the described process.

EXAMPLE 3

The mixer runs in Table 3 using a gear ratio of 1.06/1.0 to process resins A with a 0.48 and 0.46 MIs show that the 7L/15S rotor pair provides about a 100° F. reduction in ribbon temperature, and improved physical properties for film than runs using the 15L/15S rotor pair. This comparison is most clear between runs 1 and 6 and between runs 2 and 7 since conditions other than rotor style were very similar.

TABLE 3

| Run No | 2" FCM Rotor Style | Process Data 2" FCM: Prod Rate Lb/Hr (Kg/Hr) | Rotor Speed RPM | Ribbon Temp F.° (C.°) | Orifice Open % | Extr[1] Melt Temp F.° (C.°) | Blown Film Properties: Elmendorf Tear MD | Elmendorf Tear TD | Spencer Impact (Joules) |
|---|---|---|---|---|---|---|---|---|---|
| 1 | 15L/15S | 210 (95) | 1150 | 483 (250) | 100 | 513 (267) | 33 | 242 | 0.259 |
| 2 | " | 158 (72) | 1150 | 502 (260) | 100 | 505 (263) | 34 | 166 | 0.230 |
| 3 | " | 120 (54) | 1150 | 542 (283) | 100 | 498 (259) | 30 | 130 | 0.227 |
| 4 | " | 121 (55) | 600 | 409 (209) | 100 (253) | 453 | 35 | 621 | 0.370 |
| 5 | 7L/15S | 285 (179) | 1150 | 380 (193) | 100 | 482 (250) | 34 | 605 | 0.343 |
| 6 | " | 218 (99) | 1150 | 417 (214) | 100 (254) | 489 | 41 | 448 | 0.302 |
| 7 | " | 164 (74) | 1150 | 442 (227) | 100 (250) | 482 | 37 | 381 | 0.319 |
| 8 | " | 161 (73) | 700 | 382 (194) | 65 | 457 (236) | 42 | 698 | 0.362 |

EXAMPLE 4

Runs were made using the 15L/15S rotor pair and the 7L/15S rotor pair with resin C to compare barrel vs ribbon temperature. The low difference between the barrel and ribbon temperature of the 7L/15S rotor pair illustrates a better homogenity of the mixer product and provides for a more stable hot melt extruder operation using the melted ribbon. Also, the extruder can be operated at a lower temperature, saving energy and producing better quality product.

EXAMPLE 5

Runs were made to compare 15L/15S rotor pair with the 7L/15S rotor pair at a gear ratio of 1.06/1.0 using resin type C having a MI of 0.74. The data in Table 5 illustrate an amazing stability of the mixer containing the 7L/15S to fluctuations in production rate, rotor speed, and orifice opening as evidenced by ribbon temperature and pellet MI.

TABLE 4

| Run No | Rotor Style | Rotor RPM | Prod Rate Lb/Hr (Kg/Hr) | Ribbon Temp F.° (C.°) | #7[1] Temp F.° (C.°) | ΔT F.° Ribbon to #7 (C.°) | Extr. Temp F.° (C.°) | ΔT F.° Ribbon to Extr. (C.°) | ΔT F.° #7[1] To Extr. (C.°) |
|---|---|---|---|---|---|---|---|---|---|
| 1 | 15L/15S | 1150 | 246 (111) | 428 (220) | 388 (198) | +40 (+22) | 469 (243) | +41 (+23) | +81 (+45) |
| 2 | 15L/15S | 1150 | 183 (83) | 478 (248) | 428 (220) | +50 (+28) | 466 (241) | −12 (−7) | +38 (+21) |
| 3 | 15L/15S | 1150 | 137 (62) | 542 (283) | 475 (246) | +67 (+37) | 480 (249) | −62 (−34) | +5 (+3) |
| 4 | 7L/15S | 1150 | 284 (129) | 367 (186) | 370 (188) | −3 (−2) | 446 (230) | +79 (+44) | +76 (+42) |
| 5 | 7L/15S | 1150 | 177 (80) | 378 (192) | 367 (186) | +11 (+6) | 444 (229) | +66 (+37) | +77 (+43) |
| 6 | 7L/15S | 1150 | 147 (71) | 396 (202) | 370 (188) | +26 (+14) | 446 (229) | +50 (+27) | +76 (+41) |
| 7 | 7L/15S | 650 | 158 (71) | 357 (180) | 345 (174) | +8 (+6) | 433 (22) | +76 (+42) | +88 (+48) |

[1]Barrel temperature at 9¼" of 10" long rotor

TABLE 5

| Run No | 2" FCM Rotor Style | 2" FCM: Prod Rate Lb/Hr (Kg/Hr) | Rotor Speed RPM | Ribbon Temp F.° (C.°) | Orifice Open % | Hp · Hr Lb (KWH/Kg) | Hot Melt Extruder: Screw Speed RPM | Gate Press Psi (Kg/Cm²) | Melt Temp F.° (C.°) | Fluff MI | Pellet MI | Drop % |
|---|---|---|---|---|---|---|---|---|---|---|---|---|
| 1 | 15L/15S | 246 (112) | 1150 | 428 (220) | 100 | 0.108 (0.177) | 89 | 2200 (148) | 469 (242) | 0.74 | 0.47 | 36 |
| 2 | " | 183 (83) | 1150 | 478 (248) | 100 | 0.115 (0.189) | 66 | 1960 (138) | 466 (241) | " | 0.38 | 49 |
| 3 | " | 137 (62) | 1150 | 542 (283) | 100 | 0.142 (0.233) | 52 | 1760 (124) | 480 (249) | " | 0.19 | 74 |
| 4 | 7L/15S | 284 (129) | 1150 | 367 (186) | 68 | 0.094 (0.154) | 95 | 2320 (163) | 446 (230) | 0.74 | 0.43 | 42 |
| 5 | " | 177 (80) | 1150 | 378 (192) | 86 | 0.104 (0.171) | 60 | 1900 (134) | 444 (229) | " | 0.51 | 31 |
| 6 | " | 157 (71) | 1150 | 396 (202) | 100 | 0.101 (0.166) | 53 | 1840 (129) | 446 (230) | " | 0.51 | 31 |
| 7 | " | 158 (72) | 650 | 357 (180) | 53 | 0.103 (0.169) | 53 | 1900 (134) | 433 (223) | " | 0.51 | 31 |

EXAMPLE 6

Figure 6:
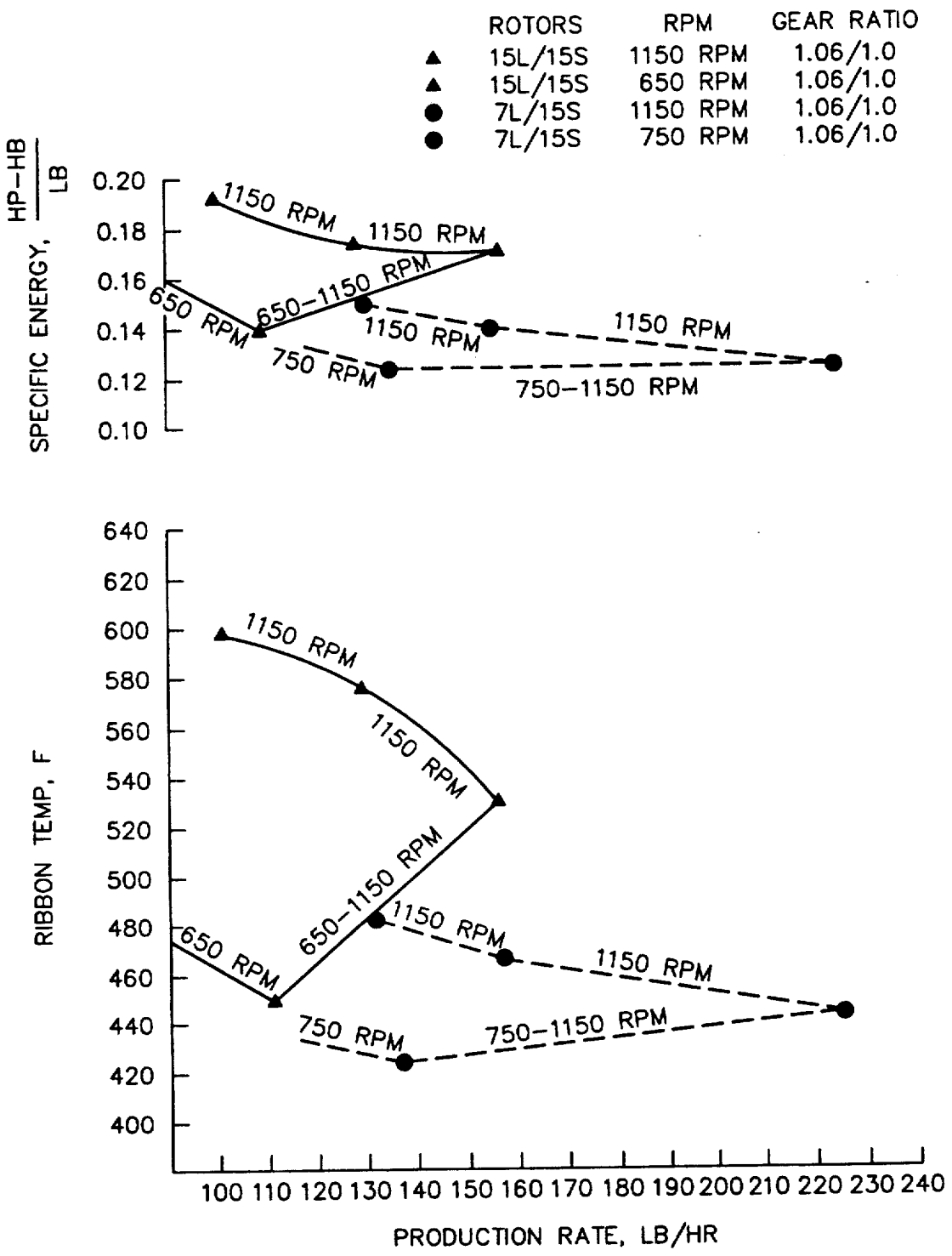
FIG. 6 graphically illustrates certain advantages achieved in accordance with practice of certain embodiments of the present invention.
Figure 7:
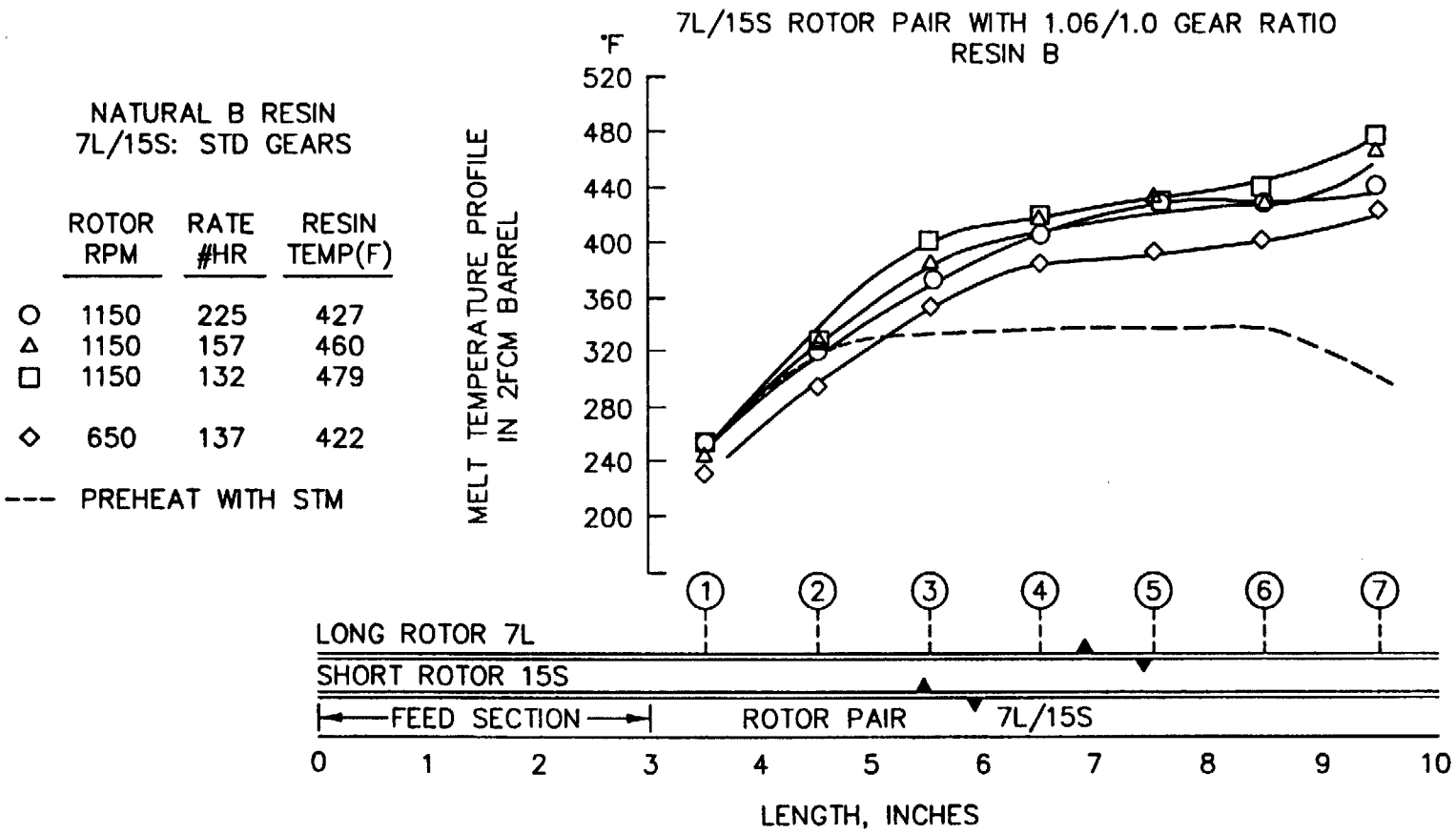
FIG. 7 is a graphical illustration of certain advantages achieved when utilizing one embodiment of the present invention.
Figure 8:
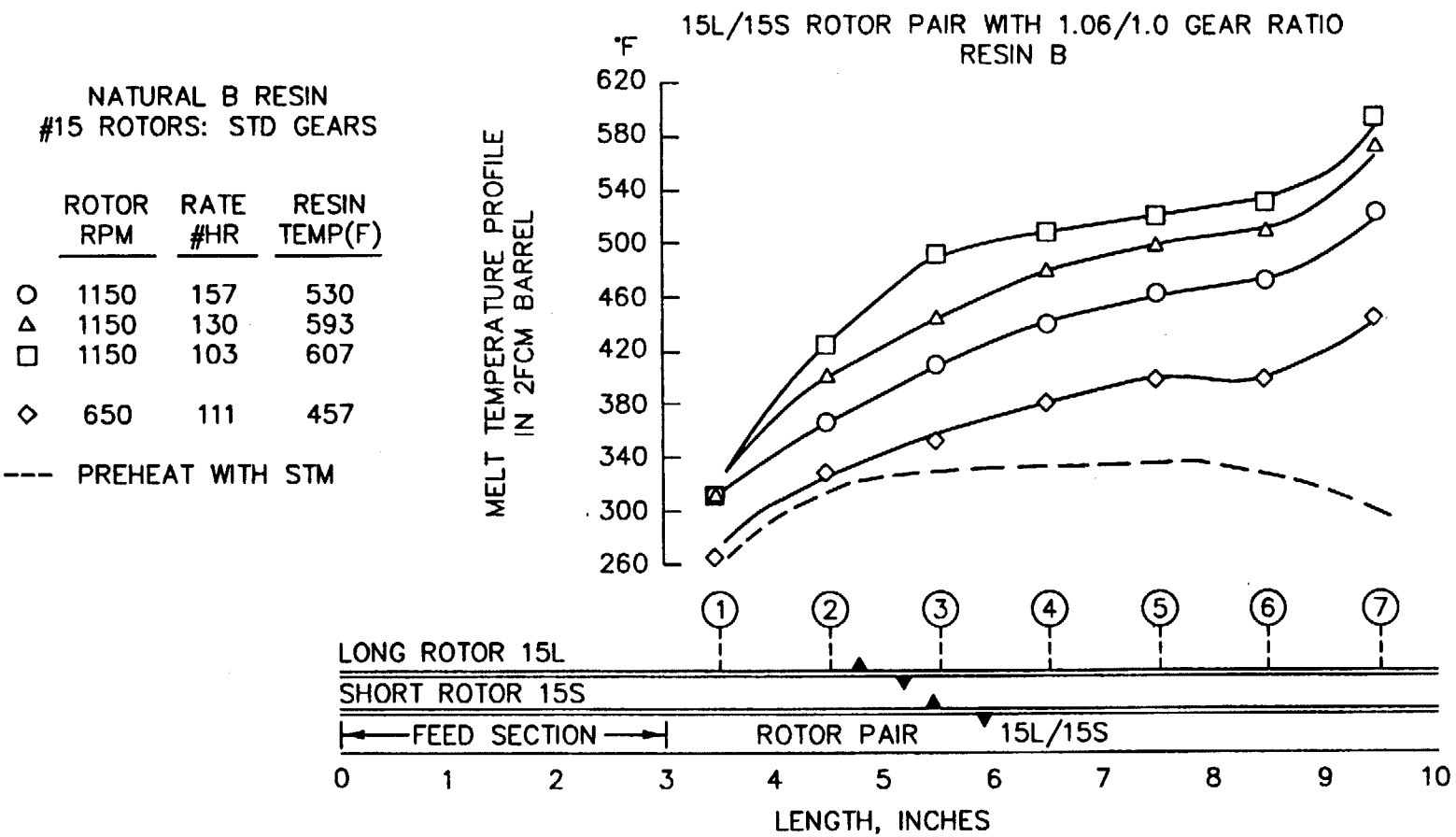
FIG. 8 is a graphical illustration of the results obtained when using a prior art device under comparable conditions to those used in FIG. 7.

In FIG. 6 the lower graph illustrates the relationship observed between production rate and ribbon temperature for the 15L/15S rotor pair (upper curve) and the 7L/15S rotor pair (lower curve). Beginning with the lower curve, the segment labeled 750–1150 RPM connects data points obtained during maximum production at 750 RPM and 1150 RPM (horsepower limited) and illustrate that speeding the rotors makes possible an increase in throughput from about 137 to about 225 lbs/hr while temperature increases from about 425° to about 445° F. The segment of the upper curve (still lower graph) labeled 650–1150 RPM connects data points obtained during maximum production (horsepower limited) at 650 and 1150 RPM and illustrate that increasing rotor speed also provides increased throughput for the 15L/15S rotor pair, from about 110 to about 155 lb/hr, not nearly as high a production rate as the 7L/15S pair. At 1150 RPM, the 7L/15S pair provides an increase in product throughput of about 45%. Also note that increasing the rotor speed to increase throughput with the 15L/15S pair results in much higher temperature product, the ribbon increasing from about 450° to about 530° F. With heat sensitive resins, it may not be possible to increase throughput with the 15L/15S pair without damaging the product. The segments of the two curves labeled 1150 RPM connect data points obtained by reducing throughput from the maximum value and noting how the resin heated up. It is thus a measure of mixer stability against fluctuations in the feed rate. In the lower curve, (lower graph) reducing the feed rate from 225 to 125 (44%) for the 7L/15S rotor pair resulted in an increase in ribbon temperature of only from 440° to 480° F. For the 15L/15S pair, ribbon temperature increased from about 530° to about 600° F. when feed decreased from 155 to 100 lbs/hr (35%). Since the 15L/15S pair processes resins at very high temperatures, an interruption in the feed could have serious implications. The segments of the curves labeled 650 RPM (15L/15S) and 750 RPM (7L/15S) are provided for comparison and are extrapolated based on experience.

In the upper graph, the data points were obtained as previously described. Comparison of the curve shows that the 7L/15S pair processes resin with higher efficiency than the 15L/15S pair at high production rates approaching the capacity of the mixer. At maximum production at 1150 RPM, the 15L/15S operated at about 0.17 HP.HR/LB while the 7L/15S operated at about 0.12 HP.HR/LB. Using the 7L/15S pair could thus reduce energy costs by about 29%. Three advantages for the 7L/15S over the 15L/15S are illustrated:

(1) Significant improvement in production rate;

(2) Significant reduction in product temperature and specific energy requirement at comparable mixer rotor speeds;

(3) Reduced specific energy requirement increase and lower product temperature increase for decreases in production rate at a constant rotor speed for starve feeding (less than mixer capacity at a given rotor speed).

EXAMPLE 7

Runs were made using Resin B to obtain temperature profiles of the resin during residence in the mixer for both the 7L/15S and 15L/15S rotor pairs for comparison at three production rates at 1150 RPM and a maximum production rate for 650 RPM. The data graphically illustrated on Charts 7 and 8 show the 7L/15S rotor pair defines a lower temperature profile to the resin which results in less degradation of the resin during processing.

EXAMPLE 8

'Prior Art'

The following table summarizes apex positioning and twist lengths for individual 2 FCM rotors known to the prior art. For these rotors, the mixing section length was 7 inches long and the apex position was measured from the upstream end of the mixing section. Stator length is measured from the downstream end of the rotor. Twist length is approximate.

TABLE

| 2 FCM Rotor | 1st Apex Position | 1st Tip Twist | 2d Apex Position | 2d Tip Twist | Stator Length |
|---|---|---|---|---|---|
| 7S | 3.14" | 9.5" | 3.54" | 9.5" | 0 |
| 7L | 3.90" | 9.5" | 4.21" | 9.5" | 0 |
| 15S | 2.45" | 9.0 | 2.88" | 10.5" | 1.75" |
| 15L | 1.81" | 9.0 | 2.21" | 10.5" | 1.75" |

The spread between the most upstream and the most downstream apexes on the 7L/15S pair is $4.21-3.14=1.07/7.0=0.15$ mixing section lengths. For the 15L/15S pair, the spread is $2.88-1.81=1.07/7.0=0.15$ mixing section lengths. For the inventive 7L/15S pair, the spread is $4.21-2.45=1.76/7.0=0.25$ mixing section lengths. For a 15L/7S pair, the spread is $3.54-1.81=1.73/7=0.25$ mixing section lengths.

The average apex position for the 7L/7S pair is $3.14+3.54+3.90+4.21=14.79/4=3.7/7.0=0.53$ mixing section lengths. The average apex position for the 15L/15S pair is $2.45+2.88+1.81+2.21=9.35/4=2.34/7.0=0.33$ mixing section lengths. For the inventive 7L/15S pair, the average apex position is $3.90+4.21+2.45+2.88=13.44/4=3.36/7.0=0.48$ mixing section lengths. For a 15L/7S, pair, the average apex position if $1.81+2.21+3.14+3.54=10.7/4=2.68/7.0=0.38$ mixing section lengths from the upstream end of the mixing section.

What is claimed is:

[1. Apparatus comprising (a) a housing defining a first generally cylindrical chamber and a second generally cylindrical chamber parallel to the first generally cylindrical chamber and laterally connected with the first generally cylindrical chamber, and a discharge orifice at a discharge end of said housing communicating with each of the first generally cylindrical chamber and the second generally cylindrical chamber;

(b) a first rotor positioned generally axially in the first generally cylindrical chamber and having a feed section and a mixing section, the mixing section having a feed and a discharge end and comprising a first mixing portion and a second mixing portion with the second mixing portion being adjacent the discharge orifice, the feed section being formed by a shaft having a screw flight attached thereto twisting in a first direction at a first rotor screw flight twist length, the first mixing portion being formed with a generally elliptical cross section having generally opposed first and second rotor tips twisting in the first direction at a first rotor first mixing portion first tip twist length and a first rotor first mixing portion second tip twist length, respectively, and the second mixing portion being formed with a generally elliptical cross section having generally opposed first and second rotor tips twisting in a second direction at a first rotor second mixing portion first tip twist length and a first rotor second mixing portion second tip twist length, respectively, the first rotor tip of the first mixing portion connecting to the first rotor tip of the second mixing portion at a first apex position at a first distance from the discharge orifice, the second rotor tip of the first mixing portion connecting to the second rotor tip of the second mixing portion at a second apex generally opposed from the first apex and positioned at a second distance from the discharge orifice, and (c) a second rotor positioned generally axially in the second generally cylindrical chamber and having a feed section and a mixing section, the mixing section comprising a first mixing portion and a second mixing portion with the second mixing portion being adjacent the discharge orifice, the feed section being formed by a shaft having a screw flight attached thereto twisting in a second direction at a second rotor screw flight twist length which is the same as or different from the first rotor screw flight twist length, the first mixing portion being formed with a generally elliptical cross section having generally opposed first and second rotor tips twisting in the second direction at a second rotor first mixing portion first tip twist length and a second rotor first mixing portion second tip twist length, respectively, the second mixing portion being formed with a generally elliptical cross section having generally opposed first and second rotor tips twisting in a first direction at a second rotor second mixing portion first tip twist length and a second rotor second mixing portion second tip twist length, respectively, the first rotor tip of the first mixing portion connecting to the first rotor tip of the second mixing portion at a third apex positioned at a third distance from the discharge orifice, the second rotor tip of the first mixing portion connecting to the second rotor tip of the second mixing portion at a fourth apex generally opposed from the third apex and positioned at a fourth distance from the discharge orifice, wherein at least one of the third distance and the fourth distance is substantially different from the first distance or the second distance.]

[2. Apparatus as in claim 1 further comprising a means for driving the first rotor and the second rotor in contrarotation so that they move toward the discharge orifice as they sweep by each other with the screw flights of the feed portions of the first rotor and the second rotor rotating so as to advance material toward the discharge orifice.]

[3. Apparatus as in claim 2 further comprising a means for driving the first rotor at a faster rate of rotation than the second rotor, said faster rate of rotation being in the range of from about 1.05 to about 1.3 times the rate of rotation of the second rotor.]

[4. Apparatus as in claim 3 wherein the twist lengths of the first tips on the first and second mixing portions of the first rotor are about equal and are in the range of 0.7–2 times the length of the mixing section, wherein the twist lengths of the second tips on the first and second mixing portions of the first rotor are about equal and are in the range of 0.7–2 times the length of the mixing section, wherein the twist lengths of the first tips on the first and second mixing portions of the second rotor are about equal and are in the range of 0.7–2 times the length of the mixing section, and wherein the twist lengths of the second tips on the first and second mixing portions of the second rotor are about equal and are in the range of 0.7–2 times the length of the mixing section.]

[5. Apparatus as in claim 4 wherein the first apex is positioned at a distance in the range of about 0.3 to about 0.7 mixing section lengths from the discharge end of the mixing section, wherein the second apex is positioned in the range of from about 0.2 to about 0.6 mixing section lengths from the discharge end of the mixing section, wherein the third apex is positioned in the range of from about 0.45 to about 0.8 mixing section lengths from the discharge end of the mixing section, and wherein the fourth apex is positioned in the range of from 0.4 to about 0.8 mixing section lengths from the discharge end of the mixing section.]

[6. Apparatus as in claim 5 wherein the second apex is positioned in the range of 0.3 to 0.5 mixing section lengths from the discharge end and is the closest apex to the discharge end of the mixing section and wherein the third apex is positioned in the range of 0.5 to 0.8 mixing section lengths from the discharge end of the mixing section and is the furtherest apex from the discharge end of the mixing section.]

[7. Apparatus as in claim 6 wherein about 0.2 to about 0.6 mixing section lengths separates the second apex from the third apex.]

[8. Apparatus as in claim 7 wherein about 0.25 to about 0.5 mixing section lengths separates the second apex from the third apex.]

[9. Apparatus as in claim 8 wherein the upstream edge of the discharge orifice is positioned at a distance in the range of from about 0.1 to about 0.3 mixing section lengths from the discharge end of the mixing section.]

[10. Apparatus as in claim 9 wherein the means for driving the first rotor at a faster rate of rotation than the second rotor drives the first rotor at about 1.1 times the rate of the second rotor, wherein the twist length of the first rotor first tips is about 1.4 times the length of the mixing section, wherein the twist length of the first rotor second tips is about 1.4 times the length of the mixing section, wherein the twist length of the second rotor first tips is about 1.3 times the length of the mixing section, wherein the twist length of the second rotor second tips is about 1.5 times the length of the mixing section, wherein the first apex is positioned about 0.45 mixing section lengths from the discharge end of the mixing section, wherein the second apex is positioned about 0.4 mixing section lengths from the discharge end of the mixing section, wherein the third apex is positioned about 0.65 mixing section lengths from the discharge end of the mixing section and wherein the fourth apex is positioned about 0.6 mixing section lengths from the discharge end of the mixing section.]

11. A process for melting a particulate material, said particulate material [being characterized as a thermoplastic resin] *comprising a polyolefin* having a flux point of between about 100° C. and 400° C.; said process comprising the steps of (a) introducing the particulate material into at least one screw feeder, and (b) forcing the particulate material by the action of the at least one screw feeder into a mixing chamber having the following characteristics (i) the mixing chamber is formed by a first generally cylindrical chamber and a second generally cylindrical chamber which are interconnecting and parallel to each other in a housing;

(ii) the at least one screw feeder is positioned at a first end of the mixing chamber;

(iii) a discharge orifice is positioned near the second end of the mixing chamber;

(iv) a first rotor is positioned in the first generally cylindrical chamber, said first rotor being characterized by a first tip beginning at the first end of the mixing chamber and following a helical path spiraling in a first rotational direction at a pitch greater than about half of a mixing chamber length and a second tip beginning at the end of the first tip and following a helical path spiraling in a second rotational direction at a pitch greater than about half of a mixing chamber length, said first tip meeting with said second tip at an apex which is positioned at a distance from the first end of the mixing chamber of between about 30% and about 70% of the distance to the second end of the mixing chamber;

(v) a second rotor is positioned in the second generally cylindrical chamber, said second rotor being characterized by a first tip beginning at the first end of the mixing chamber and following a helical path spiraling in the second rotational direction at a pitch greater than about half of a mixing chamber length and a second tip beginning at the end of the first tip and following a halical path spiraling in the first rotational direction at a pitch greater than about half of a mixing chamber length, said first tip meeting with said second tip at an apex which is positioned at a distance from the first end of the mixing chamber of between about 30% and about 70% of the distance to the second end of the mixing chamber, the difference in the positioning of the apex of the first rotor and the apex of the second rotor being at least 20% of the distance between the first end of the mixing chamber and the second end of the mixing chamber; and (c) counterrotating the first rotor and the second rotor to melt the particulate material, said first rotor and said second rotor being rotated in the direction away from the first rotor apex and the second rotor apex so that the first rotor second tip and the second rotor second tip are rotating in the direction of the discharge orifice as they sweep by each other.

12. A process as in claim 11 further comprising introducing additives into the mixing chamber for mixing with the particulate material.

13. A process as in claim 12 wherein the particulate material comprises polyethylene and the additives comprise carbon black and from about 0.5 to about 25 pounds of carbon black are introduced into the mixing chamber per every 100 pounds of polyethylene.

14. A process as in claim 13 wherein a ribbon of polyethylene melt containing carbon black is forced through the discharge orifice from the mixing chamber by the forcing of additional particulate material into the mixing chamber by the at least one screw feeder.

15. A process as in claim 14 wherein from about 0.05 to about 0.20 kilowatt hours of energy are supplied to the motor means for each kilogram of material forced from the discharge orifice.

16. A process as in claim 15 wherein the mixing chamber is further characterized in that the first rotor first tip and the first rotor second tip each have a twist length in the range of from about 0.7 to about 2 mixing chamber lengths and the first rotor apex is positioned from the first end of the mixing chamber at a distance in the range of from about 55 to about 70% of the distance to the second end of the mixing chamber; the second rotor first tip and the second rotor second tip each have a twist length in the range of from about 0.7 to about 2 mixing chamber lengths and the second rotor apex is positioned at a distance in the range of from about 30 to about 45 percent of the distance to the second end of the mixing chamber.

17. A process as in claim 16 wherein each of the first rotor and the second rotor have a generally elliptical cross section in the mixing chamber, said first rotor being further characterized by a third tip generally opposed from the first tip and a fourth tip generally opposed from the second tip, said third tip and said fourth tip coming together to form a first rotor second apex pointing in the same rotational direction as the first rotor apex and spaced from the first end of the mixing chamber between the first rotor apex and the second rotor apex; said second rotor being further characterized by a third tip generally opposed from the first tip and a fourth tip generally opposed from the second tip, said third tip and said fourth tip coming together to form a second rotor second apex pointing in the same rotational direction as the second rotor apex and spaced from the first end of the mixing chamber between the first rotor apex and the second rotor apex.

18. A process as in claim 17 further comprising rotating the first rotor at a rate in the range of 1.05 to about 1.3 times the rotational rate of the second rotor.

* * * * *